P. F. ELLICOTT.
Churn.
No. 7,454. Patented June 25, 1850.
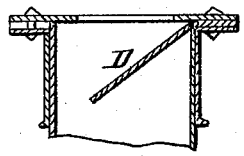
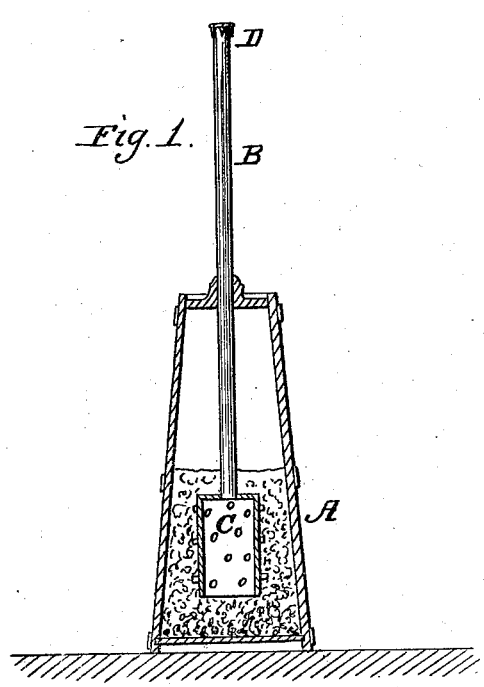

UNITED STATES PATENT OFFICE.

PETER F. ELLICOTT, OF PHILADELPHIA, PENNSYLVANIA.

ATMOSPHERIC CHURN.

Specification of Letters Patent No. 7,454, dated June 25, 1850.

*To all whom it may concern:*

Be it known that I, PETER F. ELLICOTT, of the city and county of Philadelphia and State of Pennsylvania, have invented a new and useful Improvement on a Churn for Making Butter from Milk or Cream; and I do hereby declare that the following is a full, clear, and exact description of the construction and operation of the same, reference being had to the annexed drawings, making a part of this specification, in which—

Figure 1 is a sectional view and Fig. 2 is also a sectional view.

The nature of my invention consists in placing in any ordinary vertical churn, or suitable vessel containing milk or cream, an upright hollow staff, and connecting said staff at the bottom, with a square or round hollow plunger or dasher, and placing on the inside of said staff a valve, in such a position that when the staff and plunger are raised, the valve will open, and allow the atmospheric air to fill the dasher, and when said staff and dasher are forced down, the valve will close, and the air in the dasher be driven out, through the body of the milk or cream, and by the frequent movement up and down of said staff and dasher, in the churn, and through the cream or milk, butter will be formed.

To enable others skilled in the art to make and use my invention, I will proceed to describe its construction and operation.

A, Fig. 1 is a common vertical barrel churn, with the staff or handle B projecting through the lid above it.

B, Fig. 1 is a hollow staff, connected at the lower end with the dasher or plunger C.

C, Fig. 1 is a square or round dasher or plunger being hollow and open at the lower end with air holes, in the sides, $\frac{1}{2}$ inch in diameter, and knobs outside.

D, Fig. 2 is a full size section of valve placed on the top of the staff B, Fig. 1.

What I claim as my invention, and desire to secure by Letters Patent, is—

A hollow staff connected with a square or round hollow plunger, with a valve placed at the top, or at any point inside of said staff, said valve to be so arranged that when the said staff and plunger are raised, the valve will open, and when said staff and plunger are forced down the valve will close, and the atmospheric air in the plunger will be forced through the body of the milk or cream, by which operation butter will be formed. Said staff dasher and valve to be used in any vessel containing milk or cream.

PETER F. ELLICOTT.

Witnesses:
SAML. A. ABBOTT,
GEO. C. SPRINGER.